United States Patent [19]

Talbot

[11] 4,151,230
[45] Apr. 24, 1979

[54] VALVES FOR USE IN A COOLING TOWER INSTALLATION

[75] Inventor: Edward B. Talbot, London, England

[73] Assignee: Ruckluft Patent AG., Lucerne, Switzerland

[21] Appl. No.: 860,023

[22] Filed: Dec. 12, 1977

[30] Foreign Application Priority Data

Jan. 25, 1977 [GB] United Kingdom .................. 3045/77

[51] Int. Cl.² ............................................. B01F 3/04
[52] U.S. Cl. .................................... 261/25; 251/61.1; 261/DIG. 11
[58] Field of Search ..................... 251/61.1; 137/625.4; 261/25, 109, 110, 111, DIG. 11

[56] References Cited

U.S. PATENT DOCUMENTS

| 621,718 | 3/1899 | Seymour, Jr. ...................... 261/25 X |
| 976,246 | 11/1910 | Alberger ................................. 261/25 |
| 3,227,369 | 1/1966 | Leemhuis ........................ 251/61.1 X |
| 3,252,481 | 5/1966 | Meier ................................. 137/625.4 |
| 3,253,819 | 5/1966 | Talbot .................................... 261/25 |
| 3,485,258 | 12/1969 | Greene ............................ 251/61.1 X |
| 3,512,761 | 5/1970 | O'Regan et al. ........................ 261/25 |
| 3,669,421 | 6/1972 | Murphy .................................. 261/25 |
| 3,792,720 | 2/1974 | Robbins ........................... 251/61.1 X |

FOREIGN PATENT DOCUMENTS 1348534 3/1974 United Kingdom .................... 251/61.1

Primary Examiner—Richard L. Chiesa
Attorney, Agent, or Firm—Ladas, Parry, Von Gehr, Goldsmith & Deschamps

[57] ABSTRACT

A valve comprising two compartments separated by a flexible diaphragm, each compartment being defined by an arcuate wall having an optionally interchangeable inlet and outlet located therein to allow the flow of liquid into and through the compartment, the flexible diaphragm being mounted between the arcuate walls and being adapted to be distended into one of the compartments to reduce or restrict the flow of liquid therethrough by excess pressure exerted by liquid in the other compartment; and a cooling installation containing one or more of such valves incorporated in pipelines associated with fans.

2 Claims, 10 Drawing Figures

VALVES FOR USE IN A COOLING TOWER INSTALLATION

This invention relates to an improved valve and more particularly to a valve which is adapted to be opened and closed by variations in water pressure within a pipe system. The invention is also concerned with a cooling tower system utilizing fans driven by water circulating in pipes wherein flow of the water in the pipes is regulated by the appropriate location in the circuit of one or more of the said valves.

In cooling towers where the water being cooled is used to drive one or more fans which move air over the cooling medium or packing, it is normal to pass some or all the water through a water turbine which drives the fan. Such an arrangement is disclosed in U.S. Pat. No. 3253819. Under these conditions it is possible to reduce the speed of the fan and save power or reduce cooling only by reducing the flow of water through the turbine. However, it is very often desirable to maintain the flow of water and at the same time reduce power. It has been suggested in U.S. Pat. No. 3669421 that the turbine be provided with additional openings or nozzles fed from a secondary distribution system controlled by an external valve. However, such an arrangement has a limited application.

Accordingly, it is desirable to provide a system whereby the flow of water may be regulated by an appropriate valve or valves located within the water distribution system feeding the fans. Valves are known which operate by the movement of a flexible diaphragm, for example the "Saunders Diaphragm Valves" manufactured by Saunders Valve Company Limited of Cwmbran, Monmouthshire, Great Britain; but these valves use an external mechanical system involving a valve spindle and plunger operated by an external mechanical, hydraulic, or pneumatic device to close down the diaphragm. In contrast thereto, the present invention provides a valve of relatively simple design wherein the operating liquid is used to close down the diaphragm.

It has now been found that the desired result mentioned above may be achieved by the appropriate location of a series of the novel special valves of the invention, the operation of which valves may be regulated by the water entering the cooling tower, for example, or from an external source such as main water, in such a manner that when the pressure of the water to the cooling tower is reduced then one or more of the valves opens and reduces the back pressure on the pumping system thus allowing substantially the same amount of water to be pumped as at the normal design pressure. Furthermore, further reduction in pressure may be arranged to open further valves so further reducing the back pressure on the pumping system to enable the amount of circulating water to be substantially maintained.

The operation of the system in an economic manner is facilitated by the use of special valves as provided by the present invention.

In accordance with the invention there is provided a combination flow and control valve, adapted to be incorporated in a dual-flow liquid pipeline in a cooling system, which valve comprises two symmetrical compartments separated by a flexible diaphragm, each compartment being defined by an arcuate wall having a single inlet and a single outlet, which may be interchangeable, located therein to allow the flow of liquid into and through the compartment the said inlet and outlet being interchangeable, the flexible diaphragm being mounted between the arcuate walls and being adapted to be distended into one of the compartments to reduce or restrict the flow of liquid therethrough by excess pressure exerted by liquid in the other compartment.

In a preferred embodiment of the invention the valve comprises two equal components made of plastics material which are bolted or otherwise secured about a flexible diaphragm, for example, a rubber diaphragm.

A particular advantage of the valve according to the present invention is that it contains no moving parts which require lubrication or are subject to frictional wear.

The present invention also provides a cooling installation, for example, a gas-liquid contacting apparatus, such as a cooling tower, wherein the cooling is performed by one or more fans each operated by a water turbine, which installation contains one or more valves, as hereinbefore described, the number of valves being the same as or a multiple of the number of fans, and the valve or each of the valves being associated with a fan, the valve being mounted in a pipeline, or each of the valves being mounted in series and/or parallel with each other in pipelines, which pipeline is or pipelines are located in parallel with the water feed pipe to the fans, the said valve or valves being adapted to be regulated by the pressure of the water entering the installation in such a manner that when the water pressure to the installation is reduced then the valve or valves open and reduce the back pressure on the pumping system thus allowing substantially the same amount of water to be pumped through the installation as at the design pressure, i.e., the normal operating pressure.

In an installation according to the invention comprising more than one series of valves the number of valves which open, as described above, may be determined by the actual reduction in the pressure of the entering water. Thus a small reduction in water pressure may cause only the first series of valves to open. Further reduction in pressure can be arranged to open further series of valves so further reducing the back pressure on the pumping system to enable the quantity of circulating water to be substantially maintained.

The invention will now be particularly described with reference to a preferred embodiment of the valve and an installation incorporating a series of such valves as illustrated in the accompanying drawings, in which.

Figure 1:
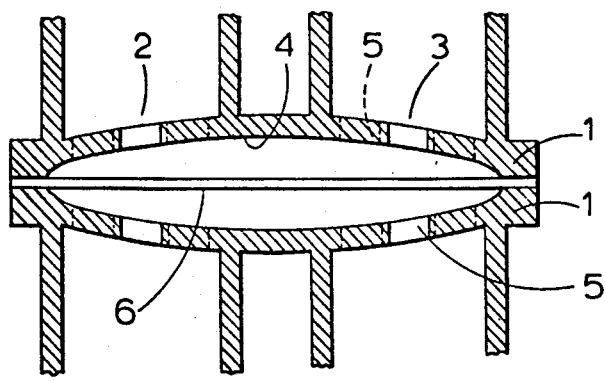
FIG. 1 is an end elevation in section of a complete valve according to the invention.

Referring in more detail to the specific embodiment illustrated in the drawings the valve illustrated in FIGS.

Figure 2:
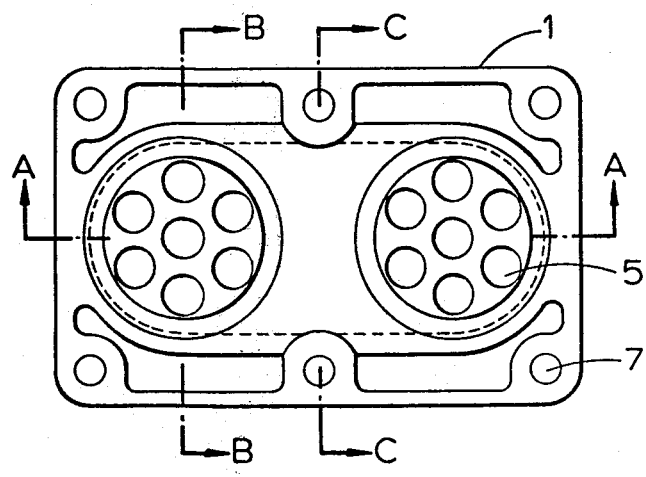
FIG. 2 is a plan of one compartment of the valve of FIG. 1.
Figure 3:
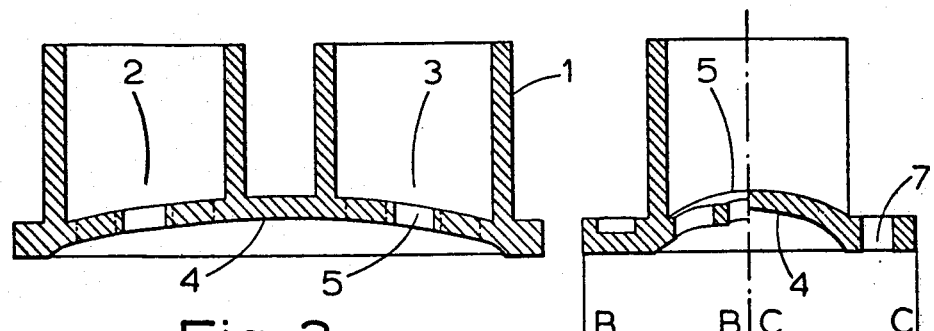
FIG. 3 is an end elevation of the compartment of FIG. 2 in section through A—A.
Figure 4:
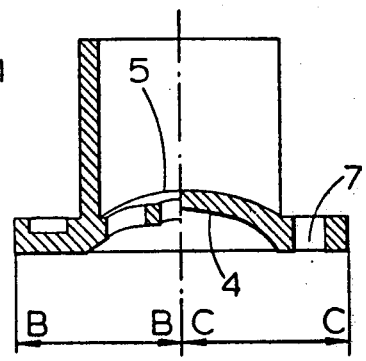
FIG. 4 is an end elevation of the compartment of FIG. 2 in half section through B—B and half section through C—C.

1-4 comprises two identical compartments 1 each formed of a plastics molding and each having an inlet 2 and outlet 3. It will be seen from the drawing that the inlet and outlet are interchangeable. The inner wall 4 of each compartment is arcuate in cross-section and the inlet and outlet each comprise a plurality of holes 5 in the arcuate wall, as illustrated in FIG. 2.

The two compartments are separated by a rubber diaphragm 6 and the complete valve unit is secured by bolts (not shown) passing through holes 7.

Figure 5:
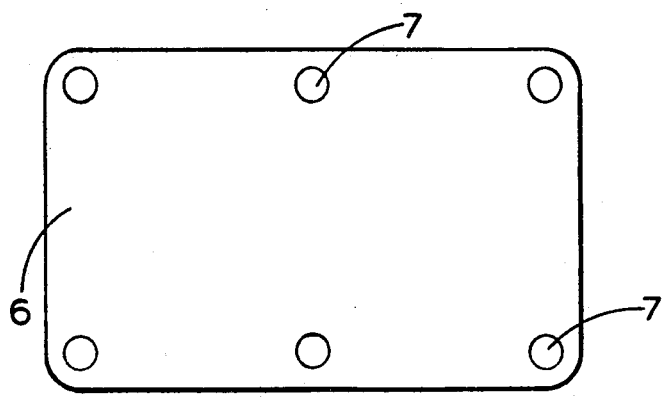
FIGS. 5, 6 and 7 show a rubber diaphragm which is mounted between the compartments of the valve.
Figure 6:
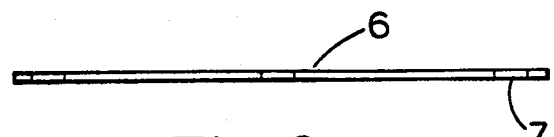
Figure 7:

FIGS. 5, 6 and 7 show the location of the bolt holes in the rubber diaphragm.

Figure 8:
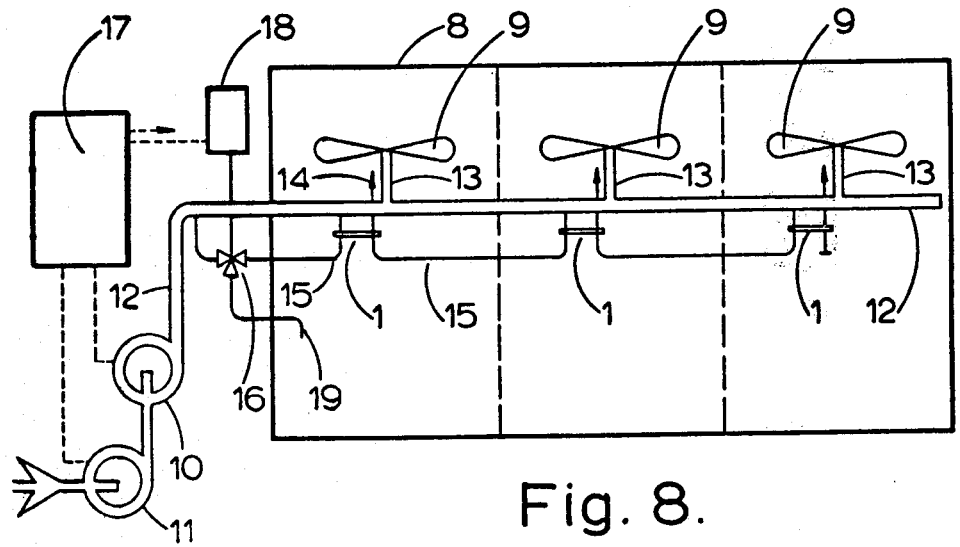
FIG. 8 is a schematic diagram of a dual flow control system in a cooling tower utilizing three valves according to the invention.

FIG. 8 of the drawings illustrates a dual flow control system applied to one pump of the pumping circuit of a cooling tower. The cooling tower 8 contains three fans 9 which are rotated by water pumped to the tower from pumps 10, 11 through pipe 12 and riser 13 to a turbine located in the hub of the fan. Bypass valves, 1, are provided with nozzles 14 which are kept closed when both pumps 10 and 11 are operating as water is allowed to enter control pipe 15 via three-way valve 16. The three-way valve is controlled from a two-pump system control box 17. When one of the pumps is shut down the control box 17 operates the solenoid 18 which regulates the three-way valve in such a way that the water from pipe 12 is shut off from control line 15. At the same time the control line 15 is allowed to vent to waste via pipe 19. This allows the diaphragm in each valve 1 to deflect, i.e., allows the valve to open, and thus allows water from pipe 12 to spray out from the nozzle 14 where it is deflected over the cooling tower.

In FIG. 8 only one three-way valve and bypass valve system is shown. Normally two such systems would be fitted. For frost conditions a further three-way valve system operated by a thermostat in the water, may be fitted.

Figure 9:
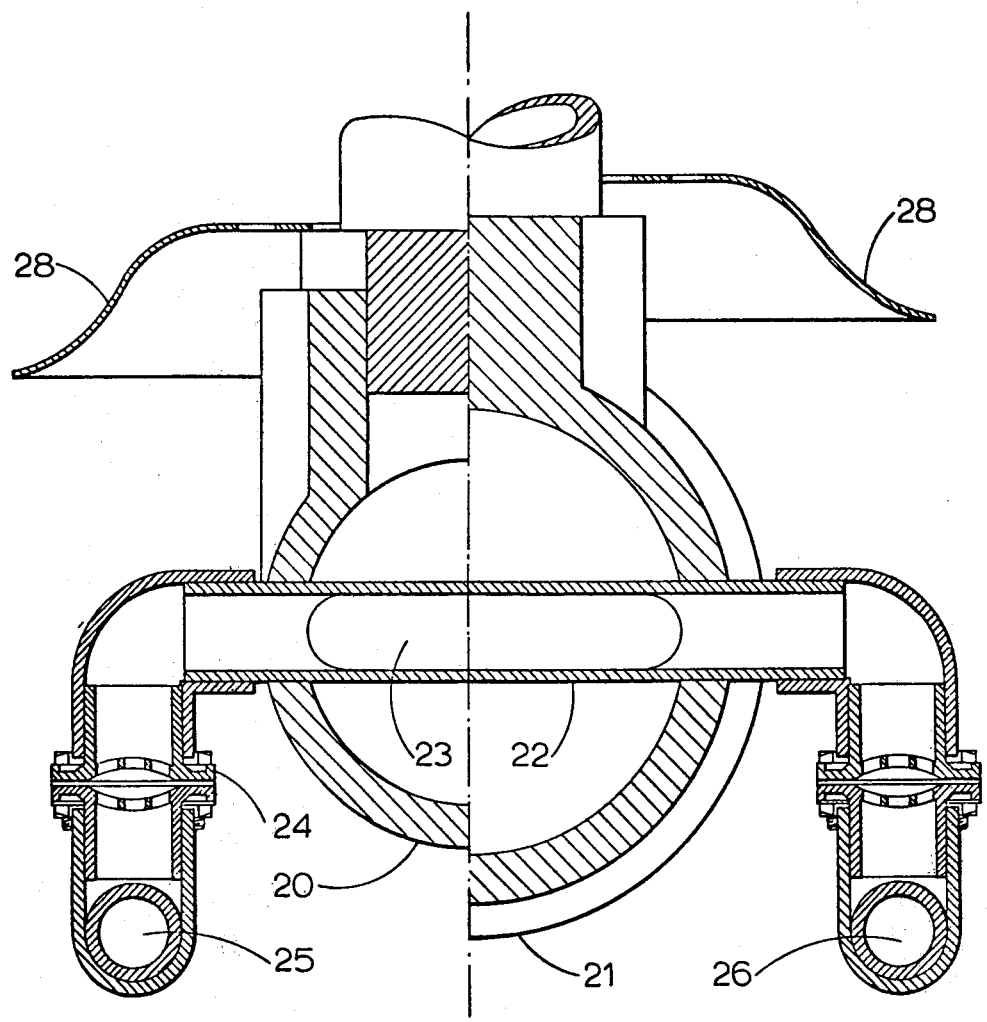
FIGS. 9 and 10 show in more detail the arrangement of the special valves on the water distribution pipe of the system of FIG. 8.
Figure 10:
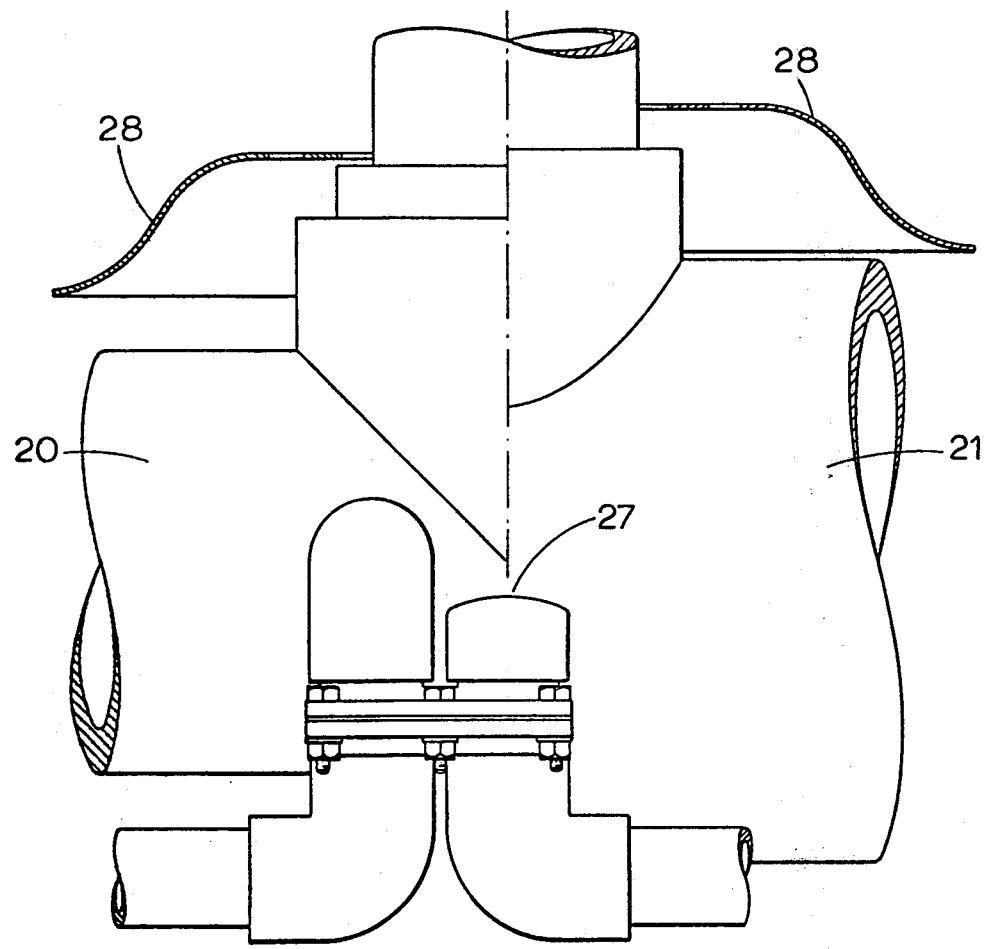

FIGS. 9 and 10 show in more detail the arrangement of the bypass valves 1 on the water distribution pipe 12. These figures show two sizes of Tee in both section and elevation. Through the center of the Tee 20(21) is positioned a small pipe 22 with a slot 23 which allows water to enter the top part of the valve 24. FIG. 9 shows two valves suspended from each end of pipe 22. These valves are operated by control lines 25 and 26 (one for each of the two pumps) which correspond to the control line 15 in FIG. 8. When the water in control lines 25 and 26 is vented to waste, water from the Tee 20(21) is allowed to pass through nozzle 27 and jet against the disc 28 which is rotated by the fan turbine and so distributes the water over the packing of the cooling tower.

It is to be understood that the preferred embodiment illustrated in FIGS. 8, 9 and 10 is not the only form of installation according to the invention. In an alternative embodiment, water may be sprayed directly from the bypass valve or valves over the packing. In yet another embodiment the water may be fed into a trough which in turn distributes it over the packing. Furthermore the control system is not limited to operation by the cooling water supply or by the circulating pumps. It may be desirable to adjust the water because the water from the supply is too cold. In such an arrangement a temperature sensing device may be located in the supply water to operate the three-way valve.

A great advantage of the system provided by the present invention is that the same size of three-way valve may be used whatever the number of bypass valves. Thus, whether there is one bypass valve or a hundred in the system, a comparatively small and inexpensive three-way valve may still be used.

By using an installation according to the present invention it is possible to obtain substantial power savings which may be as much as 50 to 80% of the maximum demand requirements and these savings may be made for up to 90% of the year.

I claim:

1. A cooling installation comprising one or more fans each operated by a water turbine, which turbine is actuated by water flowing through a feed pipe located in parallel with a pipeline in which there is incorporated one or more combination flow and control valves, each of which comprises two symmetrical compartments separated by a flexible diaphragm, each compartment being defined by an arcuate wall having a single inlet and a single outlet located therein to allow the flow of liquid into and through the compartment, the said inlet and outlet being interchangeable, the flexible diaphragm being mounted between the arcuate walls and being adapted to be distended into one of the compartments to reduce or restrict the flow of liquid therethrough by excess pressure exerted by liquid in the other compartment, the number of valves being the same as or a multiple of the number of fans, and the valve or each of the valves being associated with a fan, each of the valves being mounted in series and/or in parallel with each other in the pipeline, the said valve or valves being adapted to be regulated by the pressure of the water entering the installation in such a manner that when the water pressure to the installation is reduced then the valve or valves open and reduce the back pressure on the pumping system thus allowing substantially the same amount of water to be pumped through the installation as at the normal operating pressure.

2. An installation according to claim 1, in which there is a plurality of fans and the number of valves is the same as the number of fans, each valve being associated with a fan and being mounted in series with each other valve in a pipeline which is located in parallel with the water feed pipe to the fans.

* * * * *